(12) United States Patent
Moss

(10) Patent No.: US 6,485,636 B1
(45) Date of Patent: Nov. 26, 2002

(54) DUAL FILTER FOR DIESEL ENGINE

(76) Inventor: Loren F. Moss, 604 E. Broadway, Suite 111, Alton, IL (US) 62002

(*) Notice: Subject to any disclaimer, the term of this patent is extended or adjusted under 35 U.S.C. 154(b) by 0 days.

(21) Appl. No.: 09/723,268

(22) Filed: Nov. 28, 2000

(51) Int. Cl.$^7$ ................ B01D 35/12; B01D 35/153; B01D 35/157

(52) U.S. Cl. ................ 210/117; 210/249; 210/341; 210/420; 210/436; 210/444; 210/472

(58) Field of Search ................ 210/136, 249, 210/340, 341, 420, 436, 472, 117, 444, DIG. 17

(56) References Cited

U.S. PATENT DOCUMENTS

| | | | |
|---|---|---|---|
| 1,861,805 A | * 6/1932 | Lenz | 210/340 |
| 4,427,545 A | 1/1984 | Arguilez | 210/333.1 |
| 4,615,800 A | * 10/1986 | Stifelman et al. | 210/132 |

FOREIGN PATENT DOCUMENTS

FR 832.860 * 10/1938 ............. 210/340

* cited by examiner

Primary Examiner—Matthew O. Savage
(74) Attorney, Agent, or Firm—Don W. Weber

(57) ABSTRACT

A dual filter system for diesel fuel is provided, which allows the operator to keep the diesel engine running while inspecting or replacing one of the two fuel filters. The system includes an upper block which is divided into two identical mirror image sections. Each section has a shutoff valve, a fuel filter and a one-way check valve. Fuel is introduced into a common passageway and flows equally to each side of the upper block. Fuel is fed through each filter and filtered fuel moves through the one-way check valve to a common outport. In order to inspect or replace one filter, the fuel to the filter to be replaced is simply, shut off by the cutoff valve. All of the fuel then flows through the opposite side. The one-way check valves prevent fuel flowing through the opposite side from flowing back into the side which is being serviced. Air bleed valves are also provided in order to put the new filter side back in operation.

2 Claims, 3 Drawing Sheets

DUAL FILTER FOR DIESEL ENGINE

BACKGROUND OF THE INVENTION

This invention relates to the field of diesel engines. More particularly, a Dual Filter System for Diesel Engines is provided which allows the continuous operation of the engine even when it is necessary to change the filter.

Diesel engines are manufactured by companies such as General Motors, Detroit, Fairbanks-Morse, Alco and others. Diesel engines require diesel fuel which much necessarily be filtered prior to the fuel being fed into the engine for combustion. Diesel engine blocks are made of steel. Fuel pumps supply diesel fuel by way of high pressure hoses from the fuel tanks. The fuel must first pass through the filter system and is then fed into the fuel injectors.

Today the most common type of filter is a two filter system which is partially covered by a site bowl. The purpose of the clear site bowl is to view the fuel and the filters. However, a major drawback of the current filter systems is that the diesel engine needs to be shut off in order to change either of the filters. On barges, for example, shutting off a diesel engine can cause quite an economic burden. This is particularly true during cold weather conditions where shutting off the engine would cause added hardship. It is desirable that most diesel engines used in barges and in other applications run continuously for months or even years. However, because the fuel filter systems currently in use require the engine to be shut down in order to change the filter, it has heretofore been impossible to run the engines as desired. It is an object of this invention to provide a diesel fuel system which allows the engine to be running when the filter or filters are being changed.

Another problem with the current filter system is that when the filters become plugged, line pressure can rise to the point where the site bowl disintegrates showering the engine room and occupants with glass and hot fuel at the rate of 4.5 gallons per minute. This, of course, poses a great danger of injury to the inhabitants of the engine room. There also have been numerous instances of engine room fires and other such calamitous results.

Utilizing the present system, a filter can be taken out and inspected while the engine is running and replaced if necessary. While the site bowl system required shutting the engine down to inspect the filters, this requirement is not present in the instant invention. It is another object of this invention to provide a diesel fuel filter system which allows the inspection of the filter without shutting the engine down and without the necessity of using a dangerous site glass.

Diesel engines are used in every tow boat and railroad locomotive. They are also used in power plants, generators and oil rigs in the United States, Canada and South America. While each particular diesel engine may have its own distinct physical requirements, the instant system is interchangeable with the other site glass filter systems now in use because the instant system uses the same mounting bolt pattern as the older systems. The instant invention can also be remotely mounted on the bulkhead or engine room wall in order to retrofit the new unit to existing engines. It is a still further object of this invention to provide a dual filter system which is readily interchangeable with the current, more dangerous systems now in use.

Other advantages of this invention will become apparent upon reading the below described Specification.

BRIEF DESCRIPTION OF THE INVENTION

This new dual filter system comprises an upper block with identical left and right halves. The upper block right and left halves also contain lower right and left filters respectively. Fuel is fed into a central port and then to the right and left halves equally. The fuel in each half then circulates into the fuel filter, back up out of the fuel filter, through a one-way check valve, and back into a central fuel outlet port. Each half has a shutoff valve which enables the operator to shut off that half. When fuel is shut off to half of the system, the engine may still run utilizing the fuel fed from the other side. The existence of the one-way check valve prohibits fuel from the open side from running back through the closed side. Because one side may thus be completely shut off from a fuel supply, the fuel filter from that side may be removed, inspected, and replaced if necessary.

BRIEF DESCRIPTION OF THE DRAWING FIGURES

DETAILED DESCRIPTION OF THE PREFERRED EMBODIMENT

Figure 1:
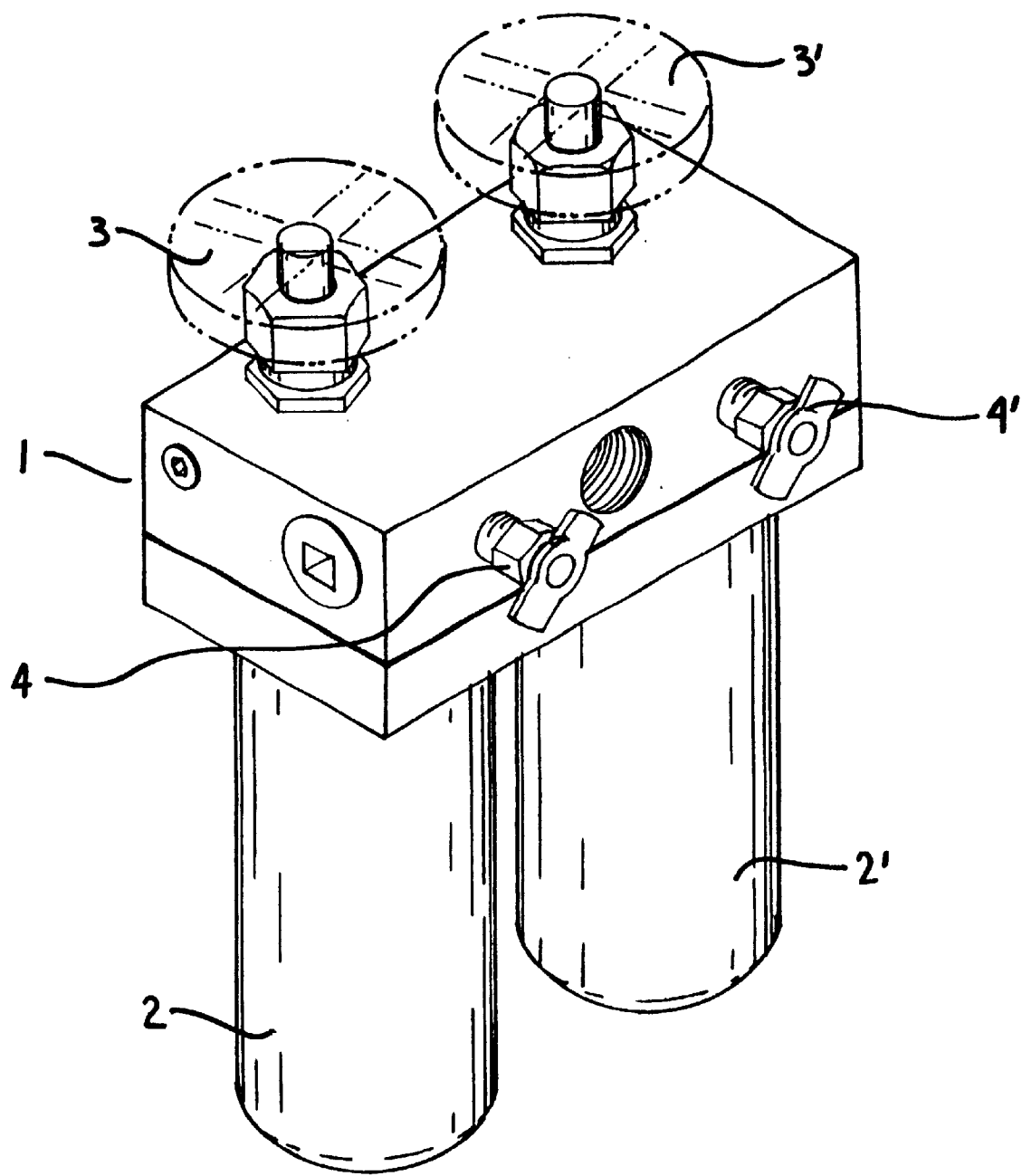
FIG. 1 is a perspective view of the dual filter system.

The dual filter system is shown in FIG. 1. The dual filter system comprises a generally rectangular upper block 1 and lower left 2 and right 2' filters. The filters 2 and 2' filter the diesel fuel being fed through them. It is the removal, inspection and replacement of each of these filters that is a main object of this invention.

The diesel fuel is fed into the upper block 1 through a main fuel port. The fuel is fed equally into the left and right halves of the upper block, as will be explained later. Left 3 and right 3' fuel cutoff valves control the incoming fuel as it is fed through the internal fuel lines to the left and right halves of the dual fuel filter system. In addition, left 4 and right 4' air bleed valves are placed within the system in order to bleed the air out of the system upon inspecting and changing the filters. The rectangular upper body 1 of the system may be made of different metals although it has been found that an aluminum block is quite suitable for this particular application. The two lower spin-on filters are standard in the industry and are in common use in the diesel fuel trade.

Figure 2:
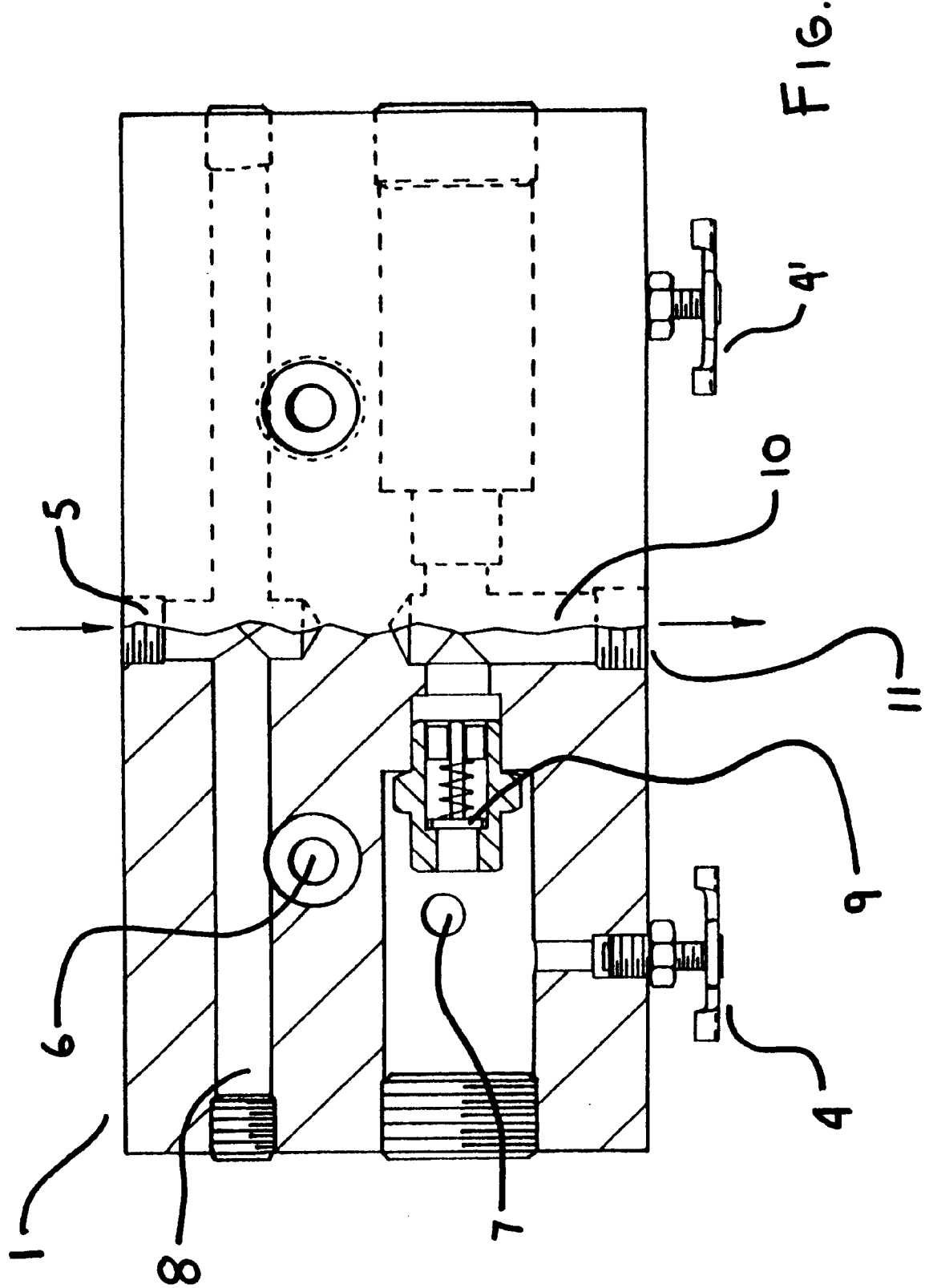
FIG. 2 is a top cutaway view of the upper block of the dual filter system shown in FIG. 1.

Turning now to FIG. 2, a top cross-sectional view of the upper block 1 is shown. FIG. 2 shows the various fuel ports and fuel lines. These fuel pathways are generally cylindrical. The upper block comprises identical left and right halves, as shown. In FIG. 2, the details of the left half are shown. However, it is to be understood that the right half of the upper block shown in FIG. 2 is a mirror-image of the left half of the upper block.

Diesel fuel is introduced into the upper block of the device through the cylindrical central fuel inport 5. The fuel is introduced as shown by the direction of the arrow and separates equally with half of the fuel going towards the left side of the upper block and the other half going towards the right side of the upper block. The fuel travels through common pathway 8 and then enters the fuel filter inport 6. It is to be noted that the fuel pathway 8 is common on both the left and right sides of the upper body and fuel has equal access to both the left and right halves of the upper block in pathway 8.

Figure 3:
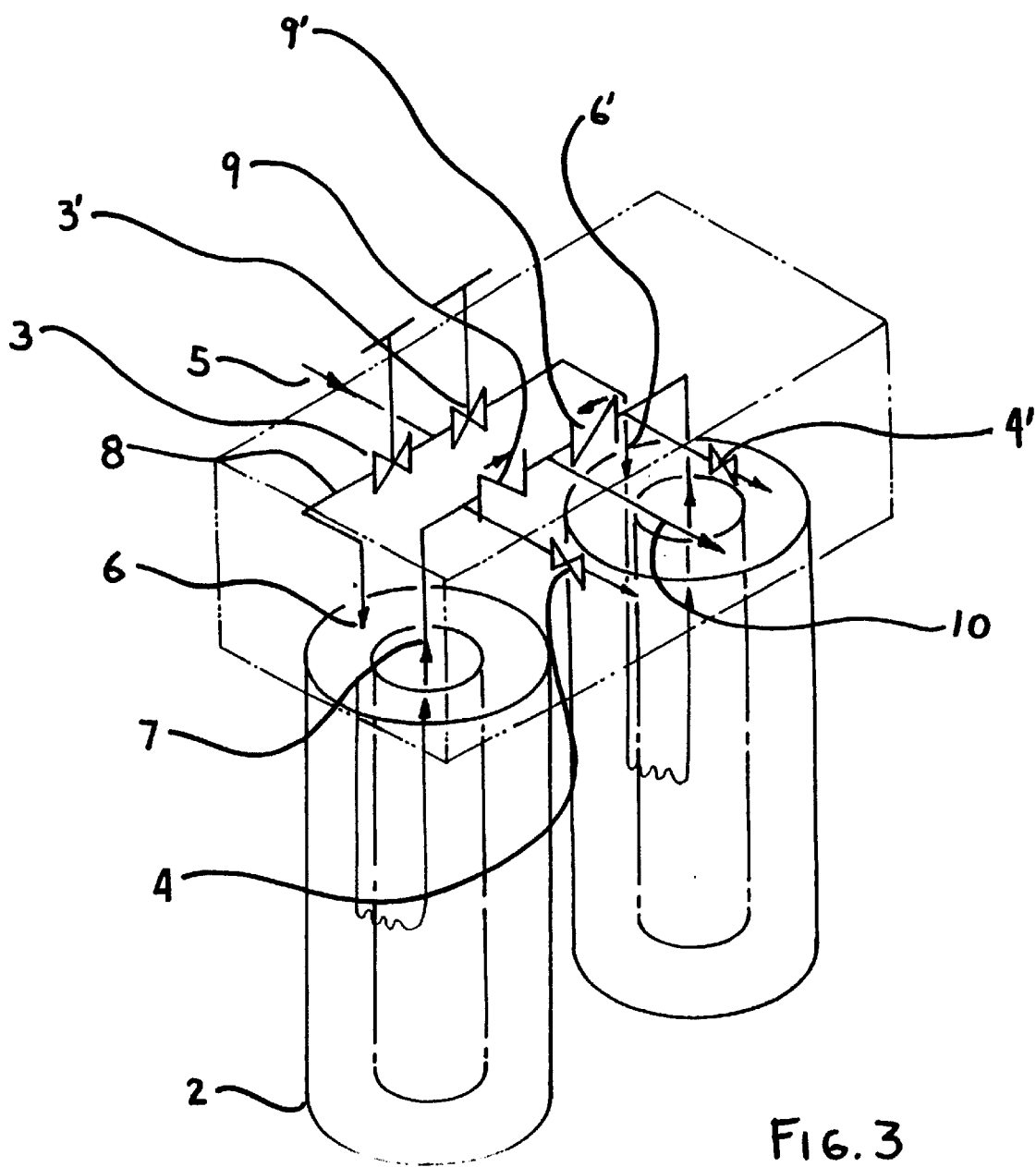
FIG. 3 is a schematic view of the dual filter system, showing the various valves and fuel pathways of the device.

The fuel filter inport 6 circulates fuel down through the fuel filter as best shown in FIG. 3. Fuel circulating into the outer portion of the fuel filter 2 is then filtered and fed back up through the inner portion of the fuel filter. The fuel exits the fuel filter from the fuel filter outport 7.

Once the fuel has been filtered and emerges from the fuel filter outport 7, it is fed through a one-way check valve 9. This one-way check valve 9 is a key to this invention in that it allows the operator to change the filters one at a time without the necessity of shutting off the fuel entirely. The one-way check valve allows fuel to flow only from left to right as shown on the left side of the upper block shown on FIG. 2. (On the right side of the upper block, which is a mirror image of the left side, fuel is allowed to flow only from right to left as shown on FIG. 2.) Once the fuel emerges from the one-way check valve 9, it is introduced into the common fuel out pathway 10.

The fuel out pathway 10 is also cylindrical and feeds filtered fuel out through the fuel outport 11 to the fuel injectors.

Turning now to FIG. 3, the fuel pathway is shown schematically. Fuel is fed in through the central fuel inport 5. It then separates through open shut-off valves 3 and 3' and is fed into the filter at 6 and 6'. The fuel is then filtered and is fed out through the center of the filter at fuel filter outport 7. The filtered fuel then passes through the one-way check valves 9 and 9' and enters the common fuel out path 10. The filtered fuel is then fed to the fuel injector and engine through the fuel outport 11.

Air bleed valves 4 and 4' are also placed between the fuel filter outport 7 and the one-way check valve 9 in order to allow the operator to bleed the air from the fuel system when a filter has been removed for inspection or replacement.

Either filter may be removed from the system, while the engine is still running, for inspection and replacement if necessary. In order to inspect or replace a filter, the operator first shuts off the fuel cut-off valve 3. All of the fuel then flows through the opposite side of the upper block and is filtered by the opposite filter. Once fuel has been shut off on one side, the fuel filter 2 may be removed from the unit and inspected or replaced. Although fuel is flowing through the right side of the unit, the one-way check valve on the left side of the unit prohibits the flow of fuel through the left fuel pathways. With the left side shut off, fuel is simply fed through the right side fuel pathways, right fuel filter, right check valve and out the common fuel out pathway 10. Once the filter on the left side is replaced, the fuel cutoff valve 3 is turned on and fuel flow once again occurs through both sides of the fuel filter system. The air bleed valve 4 may be opened in order to bleed the air out of the system in order to provide for the proper functioning of the device.

This device is interchangeable with other standard diesel filters and uses the same mounting bolt pattern as the older systems. It can be mounted directly on the engine or the engine room wall and may be adapted to many varying types of diesel engines. The device is universally applicable to diesel engines and does not require the use of a dangerous site glass in order to inspect the filters. In addition, the engine may remain running while one of the filters is changed.

Having fully described my device, I claim:

1. A dual filter device, comprising:

an upper block having left and right identical halves;

a central fuel inlet port in said block;

a common inlet passage in said block including a left hand portion extending from said central fuel inlet port to the left hand portion of the filter block and a right hand portion extending from the central fuel inlet port to the right hand portion of the filter block, wherein the left hand portion of the common inlet passage includes a left hand filter inlet port and the right hand portion of the common inlet passage includes a right hand filter inlet port;

a left hand shut-off valve located in the left hand portion of the common inlet passage between the central fuel inlet port and the left hand filter inlet port;

a right hand shut off valve separate from said left hand shut off valve, wherein said right hand shut off valve is located in the right hand portion of the common inlet passage between the central fuel inlet port and the right hand filter inlet port;

a central fuel outlet port in said block;

a common outlet passage in said block including a left hand portion extending from said central fuel outlet port to the left hand portion of the filter block and a right hand portion extending from the central fuel outlet port to the right hand portion of the filter block, wherein the left hand portion of the common outlet passage includes a left hand filter outlet port and the right hand portion of the common outlet passage includes a right hand filter outlet port;

a left spin-on fuel filter connected to the block in adjacent fluid communication with left filter inlet port and the right filter inlet port;

a right spin-on fuel filter connected to the block in adjacent fluid communication with the right filter inlet port and the right filter outlet port;

a left hand one way check valve located in the left hand portion of the common outlet passage between the central fuel outlet port and the left hand filter outlet port; and a right hand one way check valve located in the right hand portion of the common outlet passage between the central fuel outlet port and the right hand filter outlet port.

2. The dual filter device of claim 1, further comprising:

a left air bleed passage disposed in the left half of the filter block and extending to the left hand portion of the common outlet passage at a location adjacent the left hand one way check valve and the left hand filter outlet port, wherein said left hand bleed passage includes an air bleed valve located therein; and a right air bleed passage disposed in the right half of the filter block and extending to the right hand portion of the common outlet passage at a location adjacent the right hand one-way check valve and the right hand filter outlet port, wherein said right hand bleed passage includes an air bleed valve located therein.

* * * * *